Aug. 5, 1969     J. GOFFIN     3,459,375

FARMING SPRAYER

Filed July 11, 1967

United States Patent Office 3,459,375
Patented Aug. 5, 1969

3,459,375
FARMING SPRAYER
Joseph Goffin, 38 Rte. de Namur, Eghezee, Belgium
Filed July 11, 1967, Ser. No. 652,510
Claims priority, application Belgium, May 16, 1967,
43,677
Int. Cl. B05b 9/00, 9/06; F15d 1/00
U.S. Cl. 239—127                           3 Claims

ABSTRACT OF THE DISCLOSURE

In a farming sprayer having means to adjust the flow of the pump with reference to the rate of advance of the sprayer as well as a by-pass taken off the connection between the pump and the run of spraying nozzles, provided with a device for adjusting the quantity of liquid bled according to the desired quantity of liquid unit area, the improvement wherein calibrated elements are inserted in the by-pass for easily controlling the by-passed liquid.

---

In the Belgian Patent No. 673,919 I disclose a farming sprayer comprising a tank of the liquid to be sprayed, a pump, a run of spraying nozzles fed by the pump, means to adjust the flow of the pump with reference to the rate of advance of the sprayer, wherein a certain amount of liquid to be sprayed is by-passed from the conduit between the pump and the run of spraying nozzles back to the tank for adjusting the quantity of liquid bled, according to the desired quantity of liquid to be sprayed per unit area.

The present invention concerns an improvement in the control means of the by-pass of said farming sprayer.

The present invention further concerns an improvement for the control means of the by-passed liquid in a farming sprayer for facilitating the adaptation of the sprayer to different types of liquids to be sprayed by a non expert farmer.

Farming spraying comprises applying droplets containing most often fertilizers or phytopharmaceutical products on the ground or on the plants.

These applications must be carried out subject to limiting conditions of dilution, size, speed, number of droplets and homogeneity of dispersion during the movement of the sprayer.

Any important change in pressure of the liquid reaching the nozzles and any modification of the type of nozzles on the spraying pipe will alter the characteristics of the sprayed liquid (size and velocity of the droplets).

The present invention has for its object to enable the farmer to select:

(a) A type of spraying (selection of nozzles and limiting pressure values);

(b) A flow per unit area with reference to the characteristics of his tractor (possible ratios between the number of r.p.m. of the motor, of the power take-off and of the tractor wheels and limits of application of the maximum and minimum number of r.p.m. of the power take-off).

According to the invention, the adjusting device connected with the by-pass comprises at least one interchangeable element providing a passage of calibrated size for the by-passed liquid. The element is selected, according to the type of spraying, the pressure limits at the nozzles and the desired quantity of liquid per unit area, from among a series of elements with passages of different sizes.

According to the invention the farmer will select, with the help of table possible tractor speeds and, on the other hand, the characteristics of the spraying pipe nozzles and pressure needed at the outlet of the nozzles as parameters, the interchangeable element or elements which he shall have to fit on the adjusting device in order to achieve a spraying coverage for the type of liquid to be sprayed.

According to an embodiment of the invention, the adjusting device comprises more than one interchangeable element, these being mounted between two collectors, one of which is taken off the connection between the pump and the run of spraying nozzles and the other off the by-pass. In this manner a limited number of interchangeable elements enables the number of possible adjustments of the sprayer to be increased.

According to a preferred embodiment of the invention, the interchangeable elements comprise inserts provided with a calibrated orifice for the passage of the liquid.

Other details and features of the invention will become apparent from the description given hereinafter by way of example of an embodiment of the invention, with reference to the drawings, wherein.

Figure 1:
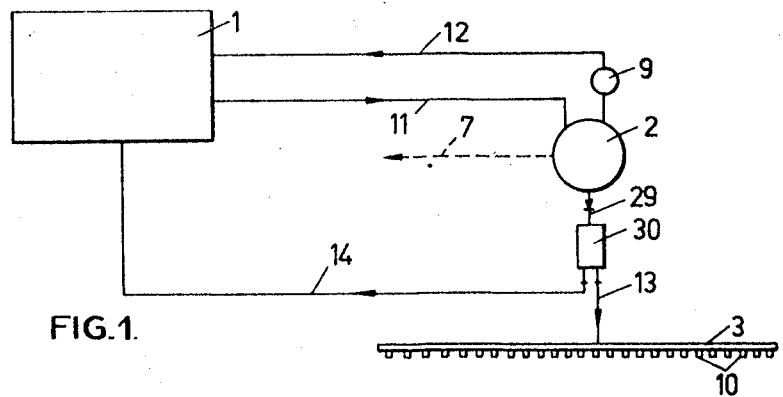
FIGURE 1 is a diagrammatic view of a sprayer comprising an adjusting device of the quantity of by-passed liquid, according to the invention.
Figure 2:
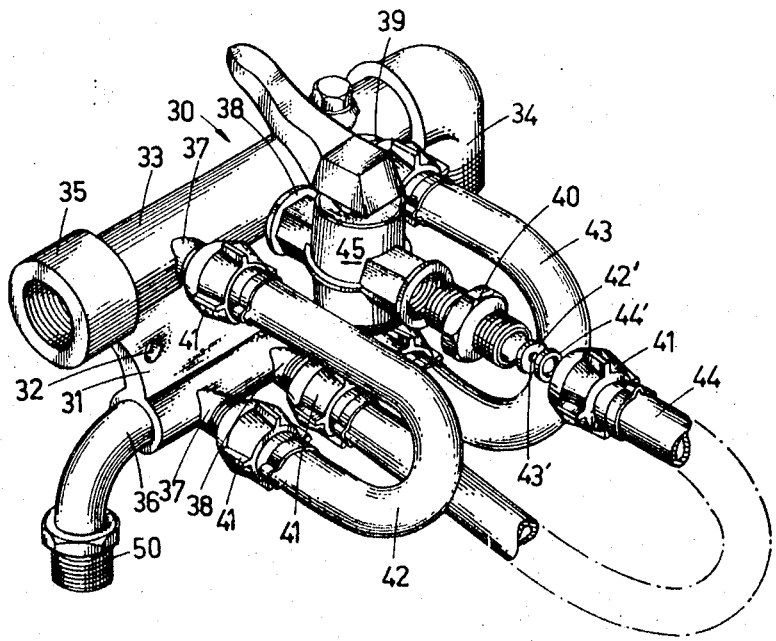
FIGURE 2 is a more detailed perspective view, in part exploded, of the adjusting device of the quantity of by-passed liquid, of a sprayer according to FIGURE 1.

The sprayer shown in FIGURE 1 comprises a tank 1 for the liquid, a pump 2, a spraying run 3 with spaced nozzles 10. The pump 2 is driven by means of the mechanical connection 7 from the tractor power take-off. Pump 2 is connected to the tank 1 by means of two hydraulic conduits 11, 12, the conduit 12 being a return pipe when safety valve 9 opens.

A hydraulic conduit 13 connects the pump 2 with the spraying run 3. The arrangement of the connection 7 enables a spraying flow proportional to the rate of advance of the sprayer. A device 30 is mounted on the hydraulic conduit 13 and a by-pass 14 is taken of the hydraulic conduit 13 downstream of the device 30·

The device 30 is built to adjust the by-passed quantity of liquid, which permits adjustment of the quantity of liquid reaching the spraying run 3 and thus the adjustment of the quantity of liquid sprayed per unit area.

The device 30 comprises a body 31 provided with bores 32 for mounting on the sprayer frame. The body 31 carries a first collector 33, provided at the ends thereof with nipples 34, 35, connected at one end to a pipe 29, leading to the pump 2, and, at the other end to the conduit 13 leading to the spraying run 3. The body 31 also carries a recessed collector 36 provided with a nipple 50 so as to connect it to the by-pass 14. Three pairs of threaded sockets 37, 38, 39 are mounted on the collectors 33, 36.

Two pipes 42, 43 are fitted in the sockets 37, 39, by means of movable nipples comprising a bolt 40 with a threaded hollow double stem and a butterfly nut 41. In each of the top bolts 40 is housed an inset 42' with a calibrated orifice 43', secured in situ by a gasket 44' and the nut 41.

A third pipe 44, wherein is housed an insert 42', is fitted in the sockets 38 in the same manner as the pipes 42 and 43 and sockets 37 and 39, respectively. Said pipe 44 may be shut off by means of a stop valve 45.

It will be appreciated that the pipes 42, 43, 44, permit a part of the liquid in the collector 33 to bleed into the collector 36 and from there the by-pass 14. The ratio of liquid bled off will be a function of the calibre of the orifices in the insets 42' and of the location of device 30 between pump 2 and spraying run 3.

Here it should be made clear that the stop valve 45 is closed under normal conditions, as it will only be opened when the sprayer runs along the edge of a field and half of the spraying run 3 is closed.

The advantage of providing the insets 42' as means of adjustment of the quantity of liquid by-passed, in order to control the characteristics of the jets sprayed through the nozzles 10, will become apparent from the example of application given hereinafter.

The pump 2 of the sprayer is driven from the power take-off of the tractor which is 540 r.p.m., its flow being then 125 litres per minute. The spraying run 3 having a working width of 12 metres is provided with 34 nozzles. The following by-pass insets are available:

| Number: | Mm. |
| --- | --- |
| 1 | 1.5 |
| 2 | 2.1 |
| 3 | 2.6 |
| 4 | 3 |
| 5 | 3.3 |
| 6 | 3.6 |
| 7 | 3.9 |
| 8 | 4.2 |
| 9 | 4.5 |
| 10 | 4.75 |
| A | 6.7 |
| B | 8.2 |
| C | 9.5 |
| D | 10.6 |

In view of the location of the adjusting device 30, in order to assure the desired pressure of 5 kg. per sq. cm. at the nozzles, the pressure at the adjusting device will have to be 8.05 kg. per sq. cm.

The experts in spraying techniques have standardised the nozzle types. In the paper "Etude de la Variabilité du Fonctionnement des têtes de Jets de Pulvérisation Mécanique" (Report on the variability of the operation of mechanical spraying heads) published by the Centre de Recherches de Phytopharmacie (Phytopharmaceutical Research Centre)—director: Prof Martens, Works' manager: Engineer Caussin—a line of standard nozzles is specified as well as their flow characteristics with reference to the pressure.

For a pressure of 5 kg. per sq. cm. the flows per minute are the following:

| Spray nozzle: | Cc. per minute |
| --- | --- |
| 00 | 940 |
| 0 | 1260 |
| 1 | 1700 |
| 2 | 2160 |
| 3 | 2520 |
| 42 | 4030 |
| 70 | 7780 |

For a rated motor speed at power take-off of 540 r.p.m., which may however vary between 400 and 600 r.p.m. the said tractor is fitted with the following speeds:

| | Km. per hr. |
| --- | --- |
| 1st speed | 2.4 |
| 2nd speed | 4.8 |
| 3rd speed | 5.4 |
| 4th speed | 6.2 |
| 5th speed | 7.2 |
| 6th speed | 9.5 |

In possession of the data stated hereinbefore and of a table which shall be handed to him, the farmer will only need to look up the type of insets 42' which he will have to fit in the device 30 in order to achieve the desired spraying.

Thus, in order to spray 500 litres per hectare at a pressure within limits of 2 and 3.5 kg. per sq. cm., of an herbicide on the ground which implies the provision of medium size droplets and therefore the possible use of "Jet Spray No. 3" nozzles, the farmer will find in his table that he has to advance at 5th speed and provide the pipes 42, 43 with inserts No. A and No. 4, respectively.

In order to spray 800 litres of water per hectare, at a pressure within limits of 7 and 12 kg. per sq. cm. of a fungicide, which implies the provision of fine droplets, therefore the possible use of "Jet Spray No. 1" nozzles, the farmer will find in his table that he has to advance at 3rd speed and provide the pipes 42, 43 with insets No. 10 and No. 2 respectively.

Similarly, in order to spray 600 litres of water per hectare at a pressure within limits of 1 kg. per sq. cm. and 2 kg. per sq. cm. of a liquid fertilizer, which implies the provision of very large droplets and therefore the possible use of "Jet Spray No. 42" nozzles, the farmer will find in his table that he has to advance at 4th speed and provide the pipes 42, 43 respectively with inserts No. C and No. 3 respectively.

It must be understood that the invention is not limited to the form of embodiment described and that many from the scope of the present patent application.

What I claim is:

1. A farming sprayer having a tank for the liquid to be sprayed, a pump, means to drive said pump, a first conduit connecting the tank to the pump, a run of spraying nozzles, a second conduit connecting the pump to the run of spraying nozzles for feeding the nozzles with liquid, a by-passing conduit between said second conduit and said tank, and a by-pass assembly interposed between the second and by-passing conduits and the run, wherein the by-pass assembly comprises: a first collector connected between the second conduit and the run, a second collector connected to the by-pass conduit, a fluid connection between first and second collectors, and a interchangeable element having a calibrated opening therethrough interposed in the fluid connection.

2. The device of claim 1, wherein said fluid connection includes a plurality of fluid loops connecting the first and second collectors.

3. The device of claim 2, wherein one of the fluid connections includes a stop valve.

References Cited

UNITED STATES PATENTS

| 2,007,036 | 7/1935 | Cornell. | |
| 2,816,572 | 12/1957 | Pratt | 138—45 X |
| 2,978,185 | 4/1961 | Pearch | 138—45 X |
| 3,044,712 | 7/1962 | Tanke | 239—155 X |

EVERETT W. KIRBY, Primary Examiner

U.S. Cl. X.R.

138—45; 239—155